United States Patent
Uesugi et al.

(10) Patent No.: US 7,848,459 B2
(45) Date of Patent: Dec. 7, 2010

(54) RADIO RECEIVING APPARATUS AND RADIO RECEIVING METHOD

(75) Inventors: Mitsuru Uesugi, Kanagawa (JP); Eiji Ota, Tokyo (JP)

(73) Assignee: Panasonic Corporation, Osaka (JP)

( * ) Notice: Subject to any disclaimer, the term of this patent is extended or adjusted under 35 U.S.C. 154(b) by 657 days.

(21) Appl. No.: 11/911,700

(22) PCT Filed: Apr. 10, 2006

(86) PCT No.: PCT/JP2006/307583

§ 371 (c)(1),
(2), (4) Date: Oct. 16, 2007

(87) PCT Pub. No.: WO2006/115030

PCT Pub. Date: Nov. 2, 2006

(65) Prior Publication Data

US 2009/0022233 A1    Jan. 22, 2009

(30) Foreign Application Priority Data

Apr. 18, 2005   (JP) .............................. 2005-119828

(51) Int. Cl.
*H04L 27/00* (2006.01)
*H03K 9/00* (2006.01)

(52) U.S. Cl. .................. 375/316; 375/260; 375/267; 375/324; 375/340

(58) Field of Classification Search ................. 375/316, 375/260, 267, 324, 340
See application file for complete search history.

(56) References Cited

U.S. PATENT DOCUMENTS

| 7,224,964 | B2 * | 5/2007 | Souissi et al. ............ 455/414.4 |
| 7,263,133 | B1 * | 8/2007 | Miao ........................ 375/267 |
| 7,339,955 | B2 * | 3/2008 | Lakkis ...................... 370/498 |
| 7,403,518 | B2 * | 7/2008 | Tsuchida et al. ........... 370/389 |
| 2002/0154717 | A1 | 10/2002 | Shima et al. |
| 2004/0101033 | A1 | 5/2004 | Suzuki |

FOREIGN PATENT DOCUMENTS

| JP | 9160594 | 6/1997 |
| JP | 2002217871 | 8/2002 |
| JP | 2002335188 | 11/2002 |
| JP | 2004221896 | 8/2004 |
| JP | 2005039526 | 2/2005 |

OTHER PUBLICATIONS

International Search Report dated Jun. 12, 2006.

* cited by examiner

*Primary Examiner*—Ted M Wang
(74) *Attorney, Agent, or Firm*—Dickinson Wright PLLC

(57) ABSTRACT

A radio receiving apparatus wherein the interference can be minimized and the power and bands can be effectively used in the process of receiving a signal comprising a combination of an impulse signal and an OFDM signal. In this apparatus, a transmission path equalizing part (205) performs a transmission path equalizing process of a signal comprising a combination of an OFDM signal and an impulse signal of UWB-IR system, and a signal separating part (208) uses a constant (C) to clip the amplitude level for a signal (Y1) demodulated as the OFDM signal, and substantially clips only the signal components of the impulse signal. Further, only when a signal (Y2) demodulated as the impulse signal exhibits an amplitude level greater than the constant (C), it is outputted, while most of the signal power of the combined OFDM signal is removed.

6 Claims, 5 Drawing Sheets

RADIO RECEIVING APPARATUS AND RADIO RECEIVING METHOD

TECHNICAL FIELD

The present invention relates to a radio receiving apparatus and radio receiving method used in a digital wireless communication system.

BACKGROUND ART

In recent years, smaller computers with higher rate and higher capacity are realized, and UWB-IR (UltraWideband-Impulse Radio) attracts attention as a communication scheme that realizes high quality and high rate communication and that is capable of accommodating a large number of users.

The UWB-IR scheme utilizes the frequency band of several GHz using an impulse of 1 ns or less, and its occupied band width becomes ultrawideband. Therefore, the UWB-IR scheme uses frequency band including the band used in the existing system and may interfere with the existing system. However, the UWB-IR scheme has low signal power density characteristics and is not likely to interfere with other systems. Further, the UWB-IR scheme has wideband, and therefore is suitable for short-distance communication such as PAN (Personal Area Network).

On the other hand, there is an OFDM (Orthogonal Frequency Division Multiplex) scheme which has already been applied to a wireless LAN (Local Area Network) system and is most likely to be applied to the fourth generation mobile communication system, as commonly referred to. In the OFDM scheme, OFDM signals are generated by superimposing information signals and the like on a plurality of orthogonal carriers, and transmission signals are generated by performing predetermined transmission processing on the OFDM signals. The transmission signals are then amplified by a power amplifier and transmitted.

Therefore, the generated OFDM signals have a defect that peak power with respect to average power increases in proportion to the number of carriers. However, by appropriately suppressing the peak power, it is possible to amplify OFDM signals to large power at ease and realize wideband communication.

Patent Document 1 discloses a technique for preventing a wireless LAN system from causing and receiving interference upon use in the same area as or in a nearby area of the communication area of the UWB wireless transmission system. That is, by delaying an impulse signal by a time period corresponding to a reciprocal of use frequency of 5 GHz in the wireless LAN system and subtracting the delayed signal from the original signal, it is possible to attenuate the frequency signal used in the wireless LAN system and prevent interference.

Patent Document 1: Japanese Patent Application Laid-Open No. 2002-335188

DISCLOSURE OF INVENTION

Problems to be Solved by the Invention

However, with the technique disclosed in Patent Document 1, a transmitting apparatus of the UWB scheme reduces interference to other systems by performing signal processing on transmission signals. That is, Patent Document 1 does not disclose reception processing of a signal combining an impulse signal and an OFDM signal.

Further, as described above, Patent Document 1 has a feature of preventing the UWB scheme from interfering with other systems. However, when other systems such as an OFDM wireless transmission system are utilized in the same area, the use frequencies contend and cause interference between the systems. In this way, between systems of different communication schemes, interference from the other system is difficult to cancel, and, as a result, power and band are wasted.

It is therefore an object of the present invention to provide a radio receiving apparatus and radio receiving method that make it possible to minimize interference in reception processing of a signal combining an impulse signal and an OFDM signal and effectively utilize power and band.

Means for Solving the Problem

The radio receiving apparatus of the present invention adopts a configuration having: a receiving section that receives a composite signal combining an impulse signal of an impulse type ultrawideband scheme and an OFDM signal of an OFDM scheme; and a demultiplexing section that demultiplexes the composite signal received by the receiving section into the impulse signal and the OFDM signal according to an amplitude level of the composite signal.

The radio receiving method of the present invention has: a receiving step of receiving a composite signal combining an impulse signal of an impulse type ultrawideband scheme and an OFDM signal of an OFDM scheme; and a demultiplexing step of demultiplexing the composite signal received in the receiving step into the impulse signal and the OFDM signal according to an amplitude level of the composite signal.

Advantageous Effect of the Invention

According to the present invention, it is possible to minimize interference in reception processing of a signal combining an impulse signal and an OFDM signal and effectively utilize power and band.

BEST MODE FOR CARRYING OUT THE INVENTION

Figure 1:
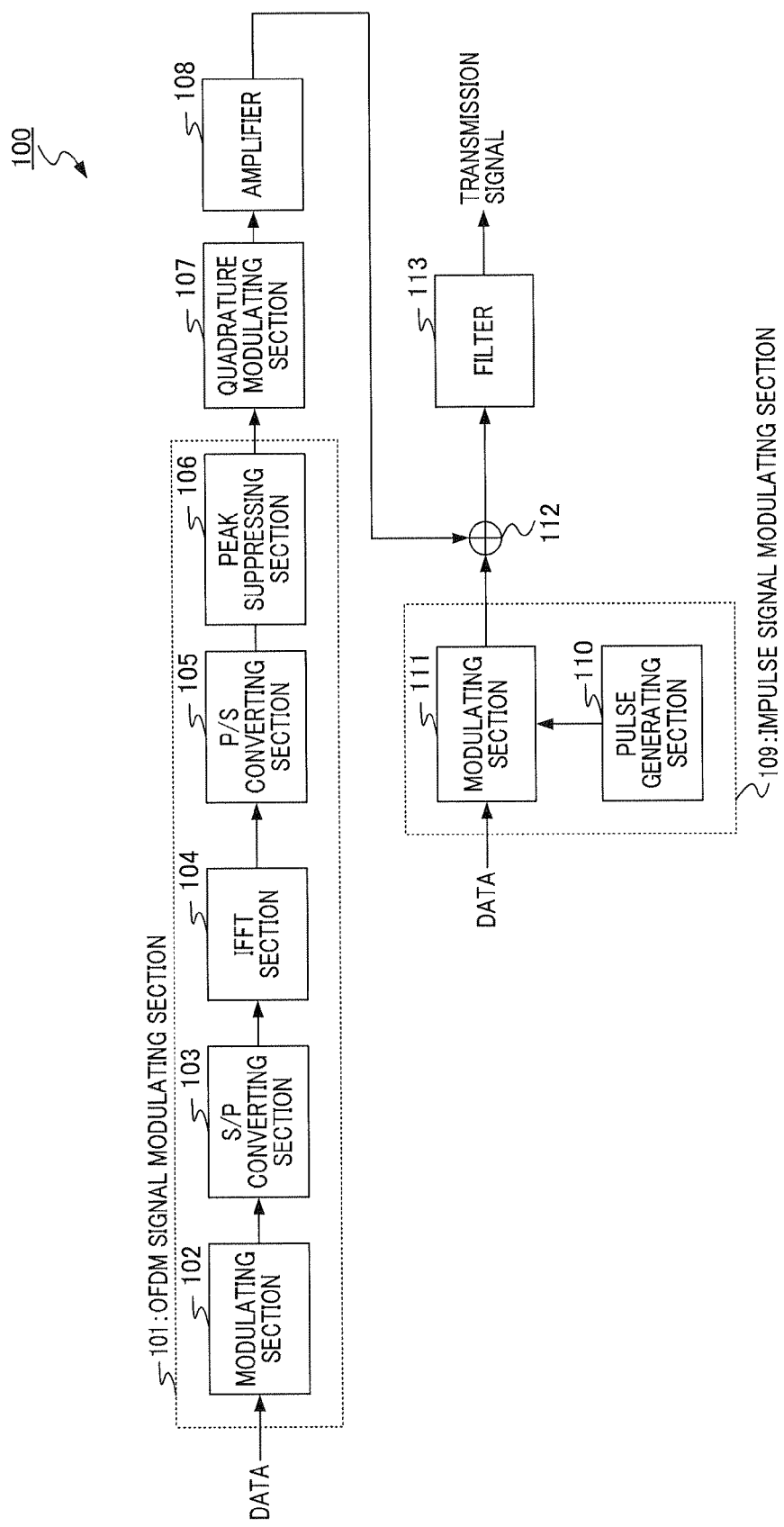
FIG. 1 is a block diagram showing a configuration of a transmitting apparatus according to Embodiment 1 of the present invention.

Embodiments of the present invention will be described in detail below with reference to the accompanying drawings. In the embodiments, components having the same functions will be assigned the same reference numerals without further explanations.

Embodiment 1

FIG. 1 is a block diagram showing the configuration of transmitting apparatus 100 according to Embodiment 1 of the present invention. In this figure, modulating section 102 of OFDM signal modulating section 101 modulates inputted data using PSK modulation or QAM modulation. The modulated signal is converted from a serial signal to a parallel signal (hereinafter "S/P conversion") at S/P converting section 103 and mapped on a per subcarrier basis. The converted parallel signal is subjected to IFFT processing at IFFT (Inverse Fast Fourier Transform) section 104, and the frequency domain signal where data is arranged on a per subcarrier basis is converted to a time domain signal. The time domain signal is converted from a parallel signal to a serial signal (OFDM signal) at P/S converting section 105 (hereinafter "P/S conversion"), and the peak power is suppressed at peak suppressing section 106.

The signal where the peak power is suppressed is subjected to quadrature modulation at quadrature modulating section 107, subjected to power amplification at amplifier 108 and outputted to combining section 112.

Pulse generating section 110 of impulse signal modulating section 109 generates 1 ns-order impulse signal, and modulating section 111 superimposes data on the impulse signal and outputs the result to combining section 112.

Combining section 112 combines the signal outputted from amplifier 108 and the signal outputted from impulse signal modulating section 109, and filter 113 limits the band and transmits the result to the receiving apparatus as transmission signals.

Figure 2:
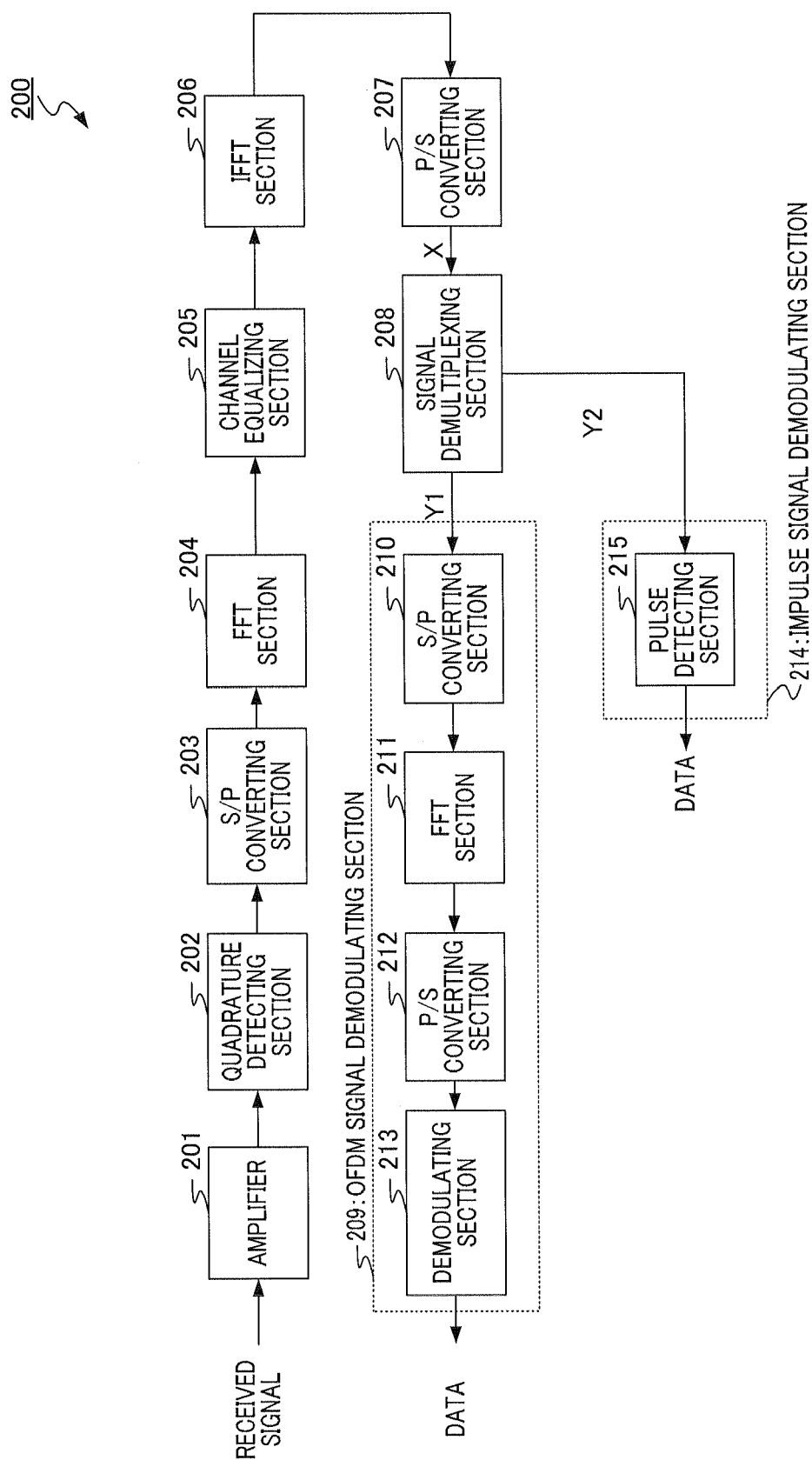
FIG. 2 is a block diagram showing a configuration of a receiving apparatus according to Embodiment 1 of the present invention.

FIG. 2 is a block diagram showing the configuration of receiving apparatus 200 according to Embodiment 2 of the present invention. In this figure, amplifier 201 receives a received signal as input, amplifies the power of the inputted received signal and outputs the amplified received signal to quadrature detecting section 202.

Quadrature detecting section 202 performs quadrature detection on the received signal outputted from amplifier 201 and outputs the detected signal to S/P converting section 203. S/P converting section 203 performs S/P conversion on the signal outputted from quadrature detecting section 202 and outputs the converted parallel signal to FFT (Fast Fourier Transform) section 204. FFT section 204 performs FFT processing on the signal outputted from S/P converting section 203, thereby converting a time domain signal to a frequency domain signal, and outputs the converted signal to channel equalizing section 205. Channel equalizing section 205 performs channel equalizing processing on the signal outputted from FFT section 204 and outputs the signal subjected to equalizing processing to IFFT section 206. IFFT section 206 performs IFFT processing on the signal outputted from channel equalizing section 205, thereby converting a frequency domain signal to a time domain signal again and outputs the converted signal to P/S converting section 207. P/S converting section 207 performs P/S conversion on the signal outputted from IFFT section 206 and outputs converted signal X to signal demultiplexing section 208.

Signal demultiplexing section 208 demultiplexes signal X outputted from P/S converting section 207 into signal Y1 which is demodulated as an OFDM signal and signal Y2 which is demodulated as an impulse signal, according to the instantaneous power level of signal X, and outputs demultiplexed signal Y1 to S/P converting section 210 in OFDM signal demodulating section 209 and demultiplexed signal Y2 to pulse detecting section 215 in impulse signal demodulating section 214. The detail of signal demultiplexing section 208 will be described later.

Signal Y1 outputted from signal demultiplexing section 208 is subjected to S/P conversion at S/P converting section 210. The converted parallel signal is subjected to FFT processing at FFT section 211 and thereby converted from a time domain signal to a frequency domain signal. The converted frequency domain signal is subjected to P/S conversion at P/S converting section 212, the converted serial signal is demodulated at demodulating section 213, and data is outputted.

On the other hand, signal Y2 outputted from signal demultiplexing section 208 is subjected to impulse detection at pulse detecting section 215, and data is outputted.

Next, above-described signal demultiplexing section 208 will be described in detail. Signal demultiplexing section 208 demultiplexes signal X outputted from P/S converting section 207 into signal Y1 and signal Y2 according to the instantaneous power level of signal X. Specifically, signal X is demultiplexed according to the following equations.

$$Y1(i) = \begin{cases} X(i) & (|X(i)| \le C) \\ C & (|X(i)| > C) \end{cases} \quad \text{(Equation 1)}$$

$$Y2(i) = \begin{cases} 0 & (|X(i)| \le C) \\ X(i) & (|X(i)| > C) \end{cases} \quad \text{(Equation 2)}$$

According to above equation 1, the amplitude level of signal Y1 demodulated as an OFDM signal is clipped at constant C. When signal Y1 is suppressed to or below constant C by peak suppression, practically, the OFDM signal component is not clipped much, and the impulse signal component alone is clipped.

Further, according to above equation 2, signal Y2 demodulated as an impulse signal is outputted only when the amplitude level exceeds constant C, and therefore most of the signal power of the combined OFDM signal is eliminated.

In this way, by demultiplexing a signal utilizing the level difference between the amplitude of the impulse signal and the amplitude of the OFDM signal, it is possible to minimize interference between the signals and realize a radio receiving apparatus compatible with the OFDM scheme and the UWB-IR scheme. Therefore, it is possible to share signal synchronization and channel estimation in signal processing of an OFDM signal and an impulse signal and save the power required for these signal synchronization and channel estimation. Accordingly, it is possible to improve communication efficiency per unit power.

Incidentally, channel equalization utilizing FFT corresponds to rake reception in the UWB-IR scheme, and therefore received signal power can be effectively utilized. Further, when channel estimation upon channel equalization is performed based on the OFDM scheme, an OFDM signal will be transmitted with larger power than an impulse signal, so that it is expected to obtain an accurate channel estimation value in a short distance which is in a range of access of the impulse signal. By this means, in the UWB-IR scheme, it is possible to efficiently collect power through rake reception.

In this way, according to Embodiment 1, the composite signal combining an OFDM signal and an impulse signal is subjected to channel equalization, and, by utilizing the amplitude level characteristics of the OFDM signal and the impulse signal, the composite signal is demultiplexed into the OFDM signal and the impulse signal according to the amplitude level of the signal subjected to the channel equalization. By this means, it is possible to minimize interference between the signals and effectively utilize power and band.

Embodiment 2

In Embodiment 2 of the present invention, the case will be described where, in the composite signal combining an OFDM signal and an impulse signal, one of the signals is cancelled as an interference component.

Figure 3:
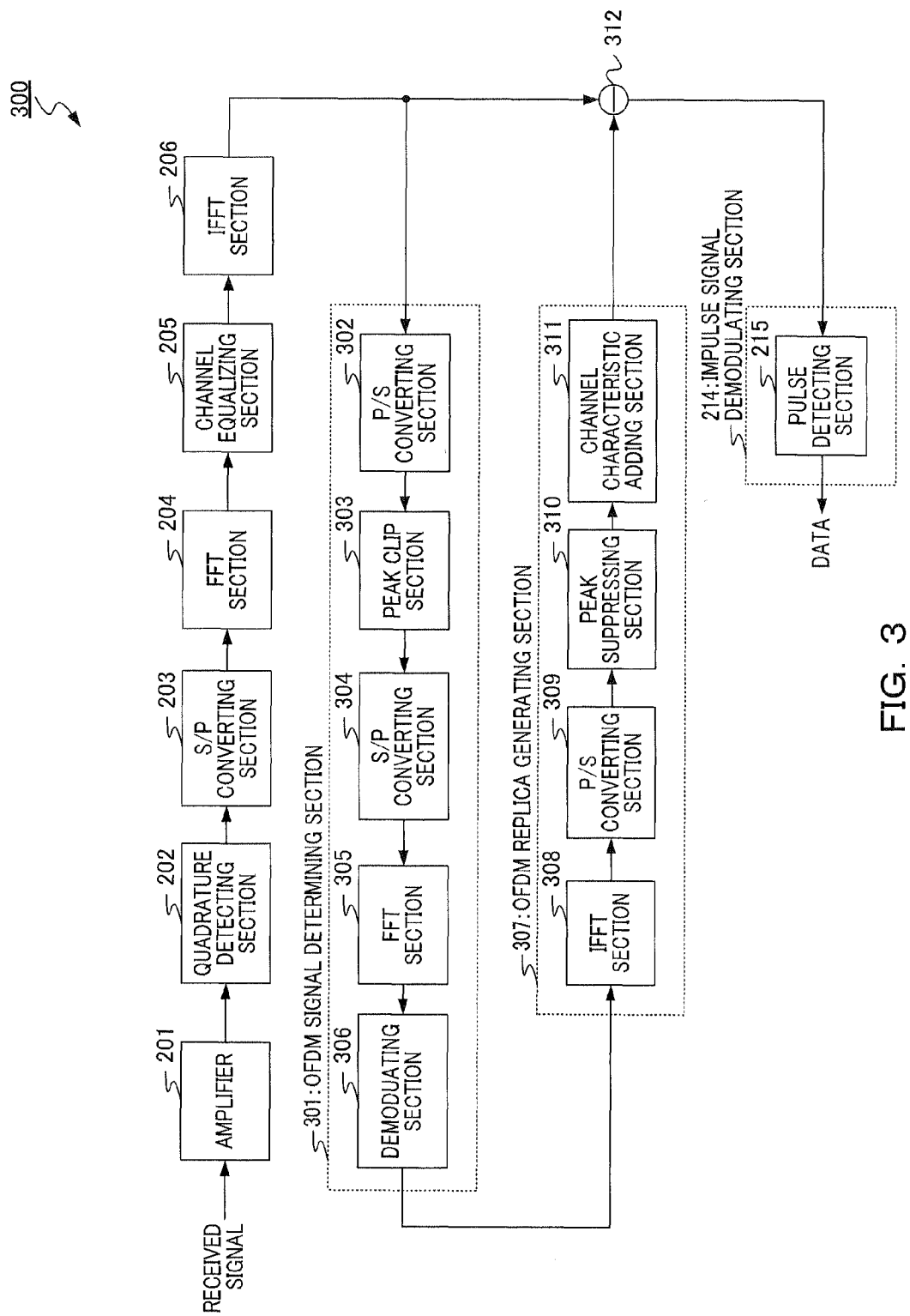
FIG. 3 is a block diagram showing a configuration of a UWB receiving apparatus according to Embodiment 2 of the present invention.

FIG. 3 is a block diagram showing the configuration of UWB receiving apparatus 300 according to Embodiment 2 of the present invention. In this figure, the signal converted from a frequency domain signal to a time domain signal by being subjected to IFFT processing at IFFT section 206, is outputted to P/S converting section 302 in OFDM signal determining section 301 and subtractor 312.

P/S converting section 302 performs P/S conversion on the signal outputted from IFFT section 206 and outputs the converted signal to peak clip section 303. Peak clip section 303 clips the impulse signal component by performing peak clipping on a signal having an amplitude level exceeding constant C out of the signals outputted from P/S converting section 302 and outputs the peak clipped signal to S/P converting section 304. S/P converting section 304 performs S/P conversion on the signal outputted from peak clip section 303 and outputs the converted signal to FFT section 305. FFT section 305 performs FFT processing on the signal outputted from S/P converting section 304, thereby converting a time domain signal to a frequency domain signal, and outputs the converted signal to demodulating section 306. Demodulating section 306 demodulates the signal outputted from FFT section 305 and outputs the demodulated signal to IFFT section 308 in OFDM replica generating section 307.

In this way, OFDM signal determining section 301 performs clipping on the impulse signal from the composite signal combining the OFDM signal and the impulse signal and demodulates the OFDM signal once.

IFFT section 308 of OFDM replica generating section 307 converts a frequency domain signal to a time domain signal by performing IFFT processing on the signal outputted from demodulating section 306 and outputs the converted signal to peak suppressing section 310 via P/S converting section 309. Peak suppressing section 310 suppresses the peak power of the signal outputted from P/S converting section 309 and outputs the signal where the peak power is suppressed, to channel characteristic adding section 311. Channel characteristic adding section 311 adds channel characteristics to the signal outputted from peak suppressing section 310 and outputs the signal to which channel characteristics are added, to subtractor 312. By this means, OFDM replica generating section 307 generates a replica of the received OFDM signal.

Subtractor 312 subtracts the OFDM replica signal, which is the output signal of OFDM replica generating section 307, from the output signal from IFFT section 206, and outputs the subtraction result to pulse detecting section 215 in impulse signal demodulating section 214. OFDM signal determining section 301, OFDM replica generating section 307 and subtractor 312 function as an OFDM signal canceling means.

When an OFDM signal and an impulse signal are combined, the phases do not always match on samples having an impulse. For example, when the phases of the signals become out of phase, the powers of the signals cancel out. Therefore, by providing the interference canceller described above, in a signal combining an OFDM signal and an impulse signal, it is possible to cancel the OFDM signal as an interference component and prevent the signal power from canceling.

Figure 4:
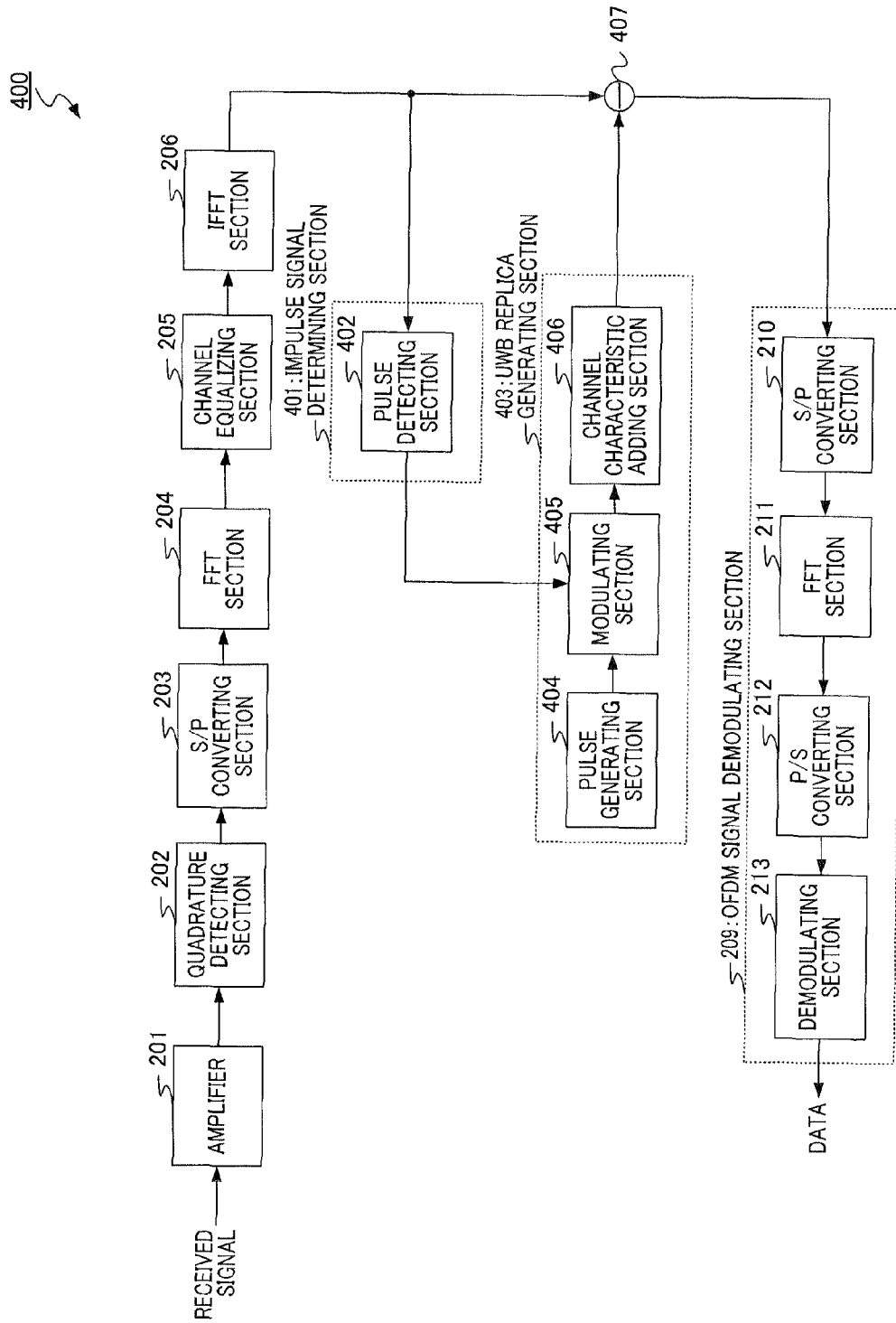
FIG. 4 is a block diagram showing a configuration of an OFDM receiving apparatus according to Embodiment 2 of the present invention.

FIG. 4 is a block diagram showing a configuration of OFDM receiving apparatus 400 according to Embodiment 2 of the present invention. In this figure, by performing IFFT processing at IFFT section 206, the signal converted from a frequency domain signal to a time domain signal is outputted to pulse detecting section 402 in impulse signal determining section 401 and subtractor 407.

Pulse detecting section 402 in impulse signal determining section 401 detects an impulse and outputs the detection result to modulating section 405 in UWB replica generating section 403. On the other hand, pulse generating section 404 in UWB replica generating section 403 generates 1 ns-order impulse signal and outputs the generated impulse signal to modulating section 405. Modulating section 405 superimposes the detection result outputted from pulse detecting section 402 upon the impulse signal outputted from pulse generating section 404, and outputs the impulse signal on which the detection result is superimposed, to channel characteristic adding section 406. Channel characteristic adding section 406 adds channel characteristics to the signal outputted from modulating section 405 and outputs the signal to which the channel characteristics are added, to subtractor 407. By this means, UWB replica generating section 403 generates a replica (UWB replica signal) of the received impulse signal.

Subtractor 407 subtracts the UWB replica signal, which is the output signal of UWB replica generating section 403, from the output signal of IFFT section 206, and outputs the subtraction result to OFDM signal demodulating section 209. Impulse signal determining section 401, UWB replica generating section 403 and subtractor 407 function as an impulse signal canceling means.

By adopting the above-described configuration, OFDM receiving apparatus 400 can cancel the UWB signal as an interference component in the signal combining the OFDM signal and the impulse signal.

In this way, according to Embodiment 2, in the signal combining the OFDM signal and the impulse signal, by canceling one of the signals as an interference component, it is possible to prevent the power from canceling even when the OFDM signal and the impulse signal are combined out of phase.

Figure 5:
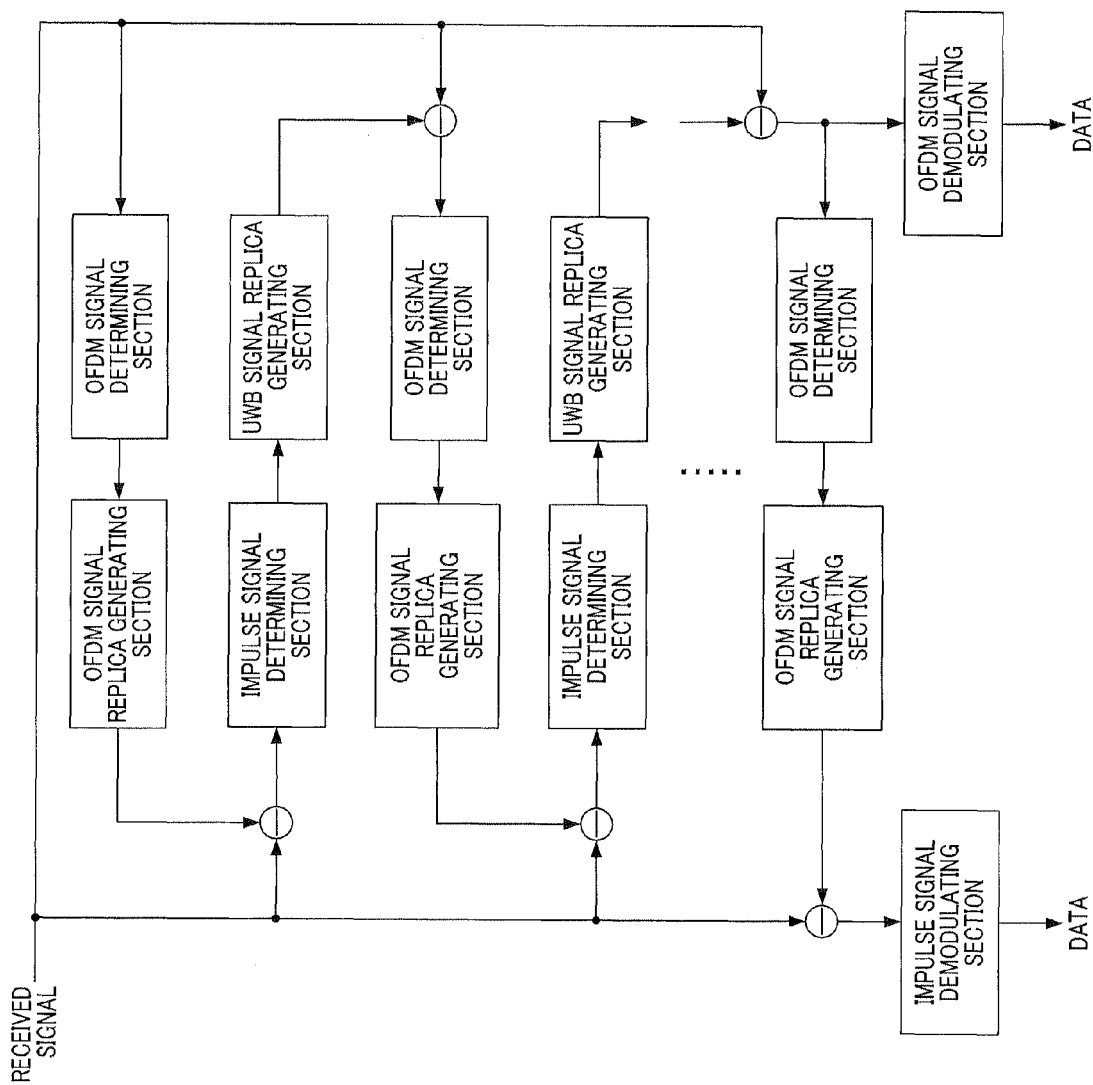
FIG. 5 is a block diagram showing a configuration where OFDM signal cancellers and impulse signal cancellers are connected alternately in sequence.

In addition, by combining the OFDM signal canceller shown in FIG. 3 and the impulse signal canceller shown in FIG. 4, and connecting the OFDM signal cancellers and impulse signal cancellers alternately, in sequence, as shown in FIG. 5, it is possible to repeat interference canceling alternately.

Further, the receiving apparatus described in Embodiment 1 and the interference canceller described in Embodiment 2 may be combined as appropriate, thereby further improving interference canceling performance.

Furthermore, in the above-described embodiments, although a case has been described where the peak of the OFDM signal is suppressed on the transmitting side, the present invention is not limited to this, and peak suppression may not be performed. However, by performing peak suppression, it is possible to reduce the load of the amplifier and perform amplification to large power at ease.

In accordance with a first aspect of the present invention, a radio receiving apparatus adopts a configuration having: a receiving section that receives a composite signal combining an impulse signal of an impulse type ultrawideband scheme and an OFDM signal of an OFDM scheme; and a demultiplexing section that demultiplexes the composite signal received by the receiving section into the impulse signal and the OFDM signal according to an amplitude level of the composite signal.

In accordance with a second aspect of the present invention, the radio receiving apparatus in the above-described configuration adopts a configuration, where the demultiplexing section performs threshold decision between the amplitude level of the composite signal and a predetermined threshold value, and, in the composite signal, demultiplexes a signal having an amplitude level exceeding the threshold value as the impulse signal, and demultiplexes a signal where an amplitude level exceeding the threshold value is clipped at the threshold value and a signal having an amplitude level less than the threshold value as the OFDM signal.

According to these configurations, by demultiplexing a signal utilizing the level difference between the amplitude of the impulse signal and the amplitude of the OFDM signal, it is possible to minimize the interference between the signals.

In accordance with a third aspect of the present invention, the radio receiving apparatus in the above-described configuration adopts a configuration further having an OFDM signal canceling section that cancels the OFDM signal in the composite signal as an interference component.

In accordance with a fourth aspect of the present invention, the radio receiving apparatus in the above-described configuration adopts a configuration further having an impulse signal canceling section that cancels the impulse signal in the composite signal as an interference component.

According to these configurations, even when the impulse signal and the OFDM signal are combined out of phase, by canceling the OFDM signal or the impulse signal in the composite signal, it is possible to prevent the signal power from canceling.

In accordance with a fifth aspect of the present invention, the radio receiving apparatus in the above-described configuration adopts a configuration further having: an OFDM signal canceling section that cancels the OFDM signal in the composite signal as an interference component; and an impulse signal canceling section that cancels the impulse signal in the composite signal as an interference component, and, in this configuration, a plurality of the OFDM signal canceling sections and the impulse signal canceling sections are alternately connected.

According to this configuration, the OFDM signal and the impulse signal are repeatedly cancelled in the composite signal, so that it is possible to prevent the signal power from canceling.

In accordance with a sixth aspect of the present invention, a radio receiving method includes: a receiving step of receiving a composite signal combining an impulse signal of an impulse type ultrawideband scheme and an OFDM signal of an OFDM scheme; and a demultiplexing step of demultiplexing the composite signal received in the receiving step into the impulse signal and the OFDM signal according to an amplitude level of the composite signal.

According to this method, by demultiplexing the signal utilizing the level difference between the amplitude of the impulse signal and the amplitude of the OFDM signal, it is possible to minimize interference between the signals.

The present application is based on Japanese Patent Application No. 2005-119828, filed on Apr. 18, 2005, the entire content of which is expressly incorporated by reference herein.

INDUSTRIAL APPLICABILITY

The radio receiving apparatus and the radio receiving method according to the present invention make it possible to minimize interference in reception processing of a signal combining an impulse signal and an OFDM signal and effectively utilize power and band, and can be applied to apparatuses such as UWB receiving apparatuses and OFDM receiving apparatuses.

The invention claimed is:

1. A radio receiving apparatus comprising:
    a receiving section that receives a composite signal combining an impulse signal of an impulse type ultrawideband scheme and an orthogonal frequency division multiplexing signal of an orthogonal frequency division multiplexing scheme; and
    a demultiplexing section that demultiplexes the composite signal received by the receiving section into the impulse signal and the orthogonal frequency division multiplexing signal according to an amplitude level of the composite signal.

2. The radio receiving apparatus according to claim 1, wherein the demultiplexing section performs threshold decision between the amplitude level of the composite signal and a predetermined threshold value, and, in the composite signal, demultiplexes a signal having an amplitude level exceeding the threshold value as the impulse signal, and demultiplexes a signal where an amplitude level exceeding the threshold value is clipped at the threshold value and a signal having an amplitude level less than the threshold value as the orthogonal frequency division multiplexing signal.

3. The radio receiving apparatus according to claim 1, further comprising an orthogonal frequency division multiplexing signal canceling section that cancels the orthogonal frequency division multiplexing signal in the composite signal as an interference component.

4. The radio receiving apparatus according to claim 1, further comprising an impulse signal canceling section that cancels the impulse signal in the composite signal as an interference component.

5. The radio receiving apparatus according to claim 1, further comprising:
    an orthogonal frequency division multiplexing signal canceling section that cancels the orthogonal frequency division multiplexing signal in the composite signal as an interference component; and
    an impulse signal canceling section that cancels the impulse signal in the composite signal as an interference component,
    wherein a plurality of the orthogonal frequency division multiplexing signal canceling sections and the impulse signal canceling sections are alternately connected.

6. A radio receiving method comprising:
    a receiving step of receiving a composite signal combining an impulse signal of an impulse type ultrawideband scheme and an orthogonal frequency division multiplexing signal of an orthogonal frequency division multiplexing scheme; and
    a demultiplexing step of demultiplexing the composite signal received in the receiving step into the impulse signal and the orthogonal frequency division multiplexing signal according to an amplitude level of the composite signal.

* * * * *